United States Patent
Uchida et al.

(10) Patent No.: US 7,608,315 B2
(45) Date of Patent: Oct. 27, 2009

(54) INSULATOR WITH HIGH THERMAL CONDUCTIVITY AND METHOD FOR PRODUCING THE SAME

(75) Inventors: Yasunori Uchida, Aichi-ken (JP); Hideyuki Fujiwara, Aichi-ken (JP); Yoshiki Nakamura, Aichi-ken (JP); Tadanobu Ota, Aichi-ken (JP); Tatsuo Suzuki, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 320 days.

(21) Appl. No.: 11/730,221

(22) Filed: Mar. 30, 2007

(65) Prior Publication Data

US 2007/0232498 A1    Oct. 4, 2007

(30) Foreign Application Priority Data

Mar. 30, 2006    (JP)    ............................. 2006-095657

(51) Int. Cl.
*H01L 23/373*    (2006.01)
(52) U.S. Cl. ................. 428/98; 174/391; 165/80.3; 165/185; 361/713; 257/706; 257/675
(58) Field of Classification Search ............... 428/98; 361/713, 704–709; 174/391, 16.3; 165/80.3, 165/185; 257/706, 707, 675
See application file for complete search history.

(56) References Cited

FOREIGN PATENT DOCUMENTS

| EP | 1041627 | 10/2000 |
|---|---|---|
| JP | A-2000-281802 | 10/2000 |

*Primary Examiner*—Alexander Thomas
(74) *Attorney, Agent, or Firm*—Posz Law Group, PLC

(57) ABSTRACT

A high thermal conduction insulator exhibiting thermal conductivity, insulating properties and heat radiating properties is produced by supplying a molding material composed of an insulating resin, a diamagnetic material powder and a paramagnetic material (inclusive of ferromagnetic material) powder, and exhibiting fluidity into a mold, and applying a magnetic field to the molding material in the mold to orient clusters, each being composed of diamagnetic material particles of the diamagnetic material powder, which are joined together like a chain, along directions of lines of a magnetic force, and draw the paramagnetic material (inclusive of ferromagnetic material) powder with the magnetic force along one of mold surfaces of the mold, thereby forming a heat radiating layer. Heat transmitted from a facing member to one surface of the insulator is speedily transmitted to the other surface thereof via the clusters, and is effectively radiated from the heat radiating layer existing in the other surface.

10 Claims, 2 Drawing Sheets

INSULATOR WITH HIGH THERMAL CONDUCTIVITY AND METHOD FOR PRODUCING THE SAME

BACKGROUND OF THE INVENTION

1. Field of the Invention

The present invention relates to an insulator which exhibits a high thermal conductivity, and a method for producing the same. The insulator exhibiting a high thermal conductivity in accordance with the present invention can be used as a heat radiating board, a heat sink, an electromagnetic wave shielding material exhibiting heat radiating properties, too, etc., which have been assembled in various electrical equipments.

2. Description of the Related Art

As electronic parts have been packed with a higher density and hybrid powered vehicles have been increased, the development of heat radiating properties of various electrical equipments has been demanded. For example, in order to accelerate the cooling of CPU, a metallic heat sink exhibiting a high thermal conductivity has been placed on the CPU, and cooled with air by means of fans. However, heat radiating boards, etc. used in the electrical equipments are frequently required to exhibit electrical insulating properties, too, and it is generally difficult that the thermal conductivity and the electrical insulating properties are both exhibited.

Under the above-described circumstances, it has been considered to use heat radiating boards composed of insulating resins, because by mixing materials, each exhibiting a high thermal conductivity, into the resins, the resultant heat radiating boards can exhibit satisfactory thermal conductivity and electrical insulating properties. Ceramics, ex. exhibit a comparatively high coefficient of thermal conductivity, and excellent insulating properties. Therefore, it can be considered to use molded bodies which are composed of the resins mixed with ceramics powder as the heat radiating boards.

In the molded body composed of a resin matrix in which ceramics powder is dispersed, however, thermal conductivity is exhibited due to accidental continuities of the ceramics powder so that in order to obtain an objective thermal conductivity, the content of the ceramics powder must be increased. However, as the content of the ceramics powder increases, the molded body may become brittle, or the molding thereof may become difficult due to the brittleness of ceramics itself. In addition, production costs become expensive.

Publication of unexamined Japanese patent application No. 2000-281802 discloses a thermal conduction molded body which is prepared by applying a magnetic field to a molding material composed of a resin and a diamagnetic material powder, orienting the diamagnetic material powder in a prescribed direction and solidifying the molding material. When the magnetic field is applied to the diamagnetic material powder, the diamagnetic material powder is oriented in the directions along the lines of magnetic force so that even a small amount of the diamagnetic material powder serves to exhibit continuity, and consequently exhibit a high thermal conductivity. Accordingly, the content of the diamagnetic material powder can be reduced while maintaining the thermal conductivity.

The thermal conduction molded body disclosed in the above publication, however, was insufficient in heat radiating properties, because such the thermal conduction molded body is composed of the resin and the diamagnetic material powder. In addition, the thermal conduction molded body disclosed in the above publication has the characteristics that the heat radiating properties in the direction vertical to the orienting direction are low, and consequently, the anisotropy in heat radiating properties is big. However, the anisotropy in heat radiating properties of the thermal conduction molded body disclosed in the above publication is insufficient. Accordingly, further improvement of the anisotropy in heat radiating properties is needed.

SUMMARY OF THE INVENTION

The present invention has been made in view of the above-described circumstances, and has an object of providing a high thermal conduction insulator which exhibits thermal conductivity, insulating properties and heat radiating properties, together.

The high thermal conduction insulator in accordance with the present invention is characterized in that a high thermal conduction insulator is used with one surface thereof in contact with a facing member, and radiates heat of the facing member from the other surface thereof, which is opposite to the one surface thereof, includes a substrate composed of an electrical insulating resin, and having one surface and the other surface, and a diamagnetic material powder and a paramagnetic material (inclusive of ferromagnetic material) powder, which are included in the substrate. A plurality of diamagnetic particles are joined together like a chain as a cluster, and oriented in the direction from the one surface to the other surface, and paramagnetic material (inclusive of ferromagnetic material) particles mainly exist on the side of the other surface to form a heat radiating layer.

It is desirable that at least one part of the paramagnetic material (inclusive of ferromagnetic material) powder appears on the other surface of the substrate. In addition, it is desirable that the diamagnetic material powder also exists in one part of the heat radiating layer.

The producing method in accordance with the present invention, which is capable of producing the high thermal conduction insulator in accordance with the present invention, is characterized by the steps of supplying a molding material exhibiting fluidity, which is composed of a liquid resin exhibiting electrical insulating properties, a diamagnetic material powder and a paramagnetic material (inclusive of ferromagnetic material) powder into a mold, applying a magnetic field to the molding material supplied into the mold to orient clusters, each being composed of diamagnetic material particles joined together like a chain, along the directions of lines of magnetic force, and draw the paramagnetic material (inclusive of ferromagnetic material) powder with the magnetic force so as to conform to one of mold surfaces of the mold, and solidifying the molding material in the mold to secure the diamagnetic material powder and the paramagnetic material (inclusive of ferromagnetic material) powder to the matrix resin.

In accordance with the high thermal conduction insulator of the present invention, since no paramagnetic material (inclusive of ferromagnetic material) powder exists in one surface of the substrate, which is adapted to contact a facing member, high electrical insulating properties are provided against the facing member. In addition, heat transmitted from the facing member to the one surface is speedily transmitted to the other surface with the clusters, each being composed of the diamagnetic material particles joined together like a chain, and is radiated efficiently from the heat radiating layer existing in the other surface. Namely, the thermal conductivity, insulating properties and radiation properties are exhibited together.

In accordance with the high thermal conduction insulator of the present invention, since the diamagnetic material powder and the paramagnetic material (inclusive of ferromagnetic material) powder perform different functions, and are mainly located in different positions, their functions can be performed even with small contents. Therefore, troubles caused by the existence of magnetic material powders can be restrained, whereby troubles that molded bodies become brittle, molding steps become difficult, or molding costs become expensive can be restrained.

In addition, according to the high thermal conduction insulator of the present invention, since the heat radiating layer is composed of the paramagnetic material (inclusive of ferromagnetic material) powder, the heat radiating layer can shield electromagnetic waves. Consequently, the high thermal conduction insulator of the present invention can be also used as a shielding member against electromagnetic waves, which exhibits heat radiating properties, too.

And in accordance with the producing method of the high thermal conduction insulator of the present invention, clusters, each being composed of a plurality of diamagnetic material particles joined together like a chain, and a heat radiating layer which is formed by integrally combining the paramagnetic material (inclusive of ferromagnetic material) powder with a substrate, can be formed in a single molding step. Therefore, the productivity is enhanced so that the high thermal conduction insulator of the present invention can be produced with a lower price.

DETAILED DESCRIPTION OF THE PREFERRED EMBODIMENTS

Figure 1:
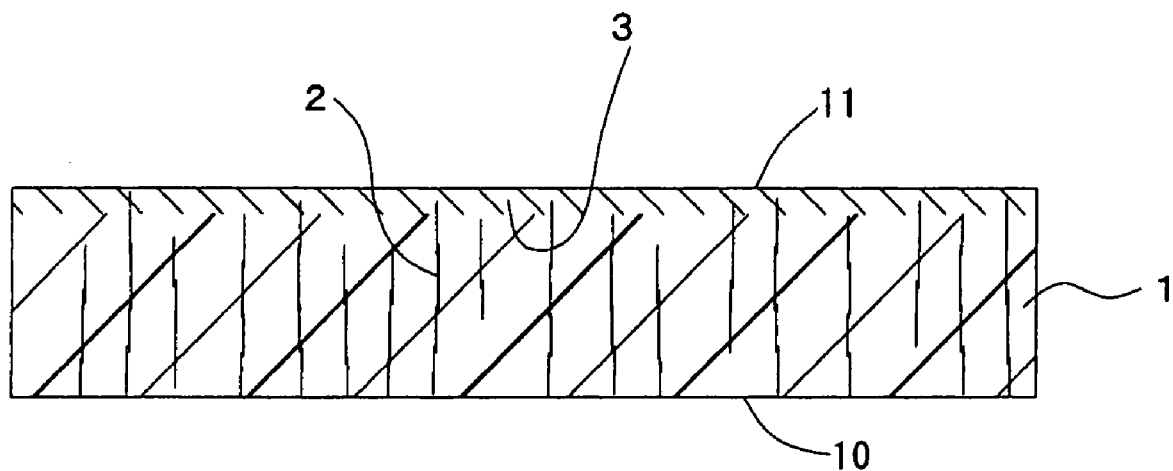
FIG. 1 is a model cross-sectional view of a heat radiating board in one embodiment of the present invention.

The high thermal conduction insulator in accordance with the present invention is composed of a substrate, a diamagnetic material powder and a paramagnetic material (inclusive of ferromagnetic material) powder. Various kinds of resins, each exhibiting electrical insulating properties, can be used as the substrate, and for example, various kinds of thermoplastic resins such as polyolefin, PET, polyamide, ABS, acryl, polyester, etc. and various kinds of thermosetting resins such as epoxy resin, phenol resin, silicone resin, etc. can be used. The configuration of the substrate is not specifically limited provided that the substrate has one surface adapted to contact a facing member such as an electrical equipment, and has the other surface which is located on the opposite side of the one surface.

Materials of which the thermal conductivity is higher than that of the substrate can be used as the diamagnetic material powder, and ceramics such as alumina, aluminum nitride, boron nitride, zirconia, titania, magnesia, silicon nitride, silicon carbide are preferable materials. In particular, boron nitride, alumina, silicon nitride, etc., each having a coefficient of thermal conductivity, which is greater than 20 W/m·k, is particularly desirable.

These diamagnetic material powders have anisotropic configurations such as a needle-shaped configuration, scale-shaped configuration, fiber-shaped configuration, etc., and it is particularly preferable to have the aspect ratio of 5 or more. By using the diamagnetic material powders having anisotropic configurations, the orientation in the magnetic field is facilitated so that the continuity of the clusters is enhanced, whereby a higher thermal conductivity can be effected with a smaller amount of the diamagnetic material powders.

The most suitable content of the diamagnetic material powders depends on the quality, configuration thereof, material of the substrate, etc., but preferably ranges from 10 volume % to 40 volume % in general. Where the content is less than this range, the formation of the clusters becomes difficult, whereas where the content is greater than this range, the substrate may become brittle, and the molding of the substrate may become difficult.

Examples of the paramagnetic material (inclusive of ferromagnetic material) powder include SUS powder, aluminum powder, iron powder, ferrite, nickel, etc., and in particular, iron powder, ferrite, nickel, etc. as the ferromagnetic material powder are preferable. The configuration of the paramagnetic material (inclusive of ferromagnetic material) powder is not specifically limited. A spherical configuration can be used, but a scale-shaped configuration is particularly preferable. Since, in the case of the scale-shaped configuration, the orientation may be readily performed as a layer in the other surface of the substrate so that, in such a case, the heat radiating properties can be effected with a smaller amount of the paramagnetic material (inclusive of ferromagnetic material) power.

The content of the paramagnetic material (inclusive of ferromagnetic material) powder is not specifically limited provided that a resultant heat radiating layer can cover the other surface of the substrate as a layer, but it is preferable to make the thickness of the heat radiating layer thinner. Therefore, though such a content depends on the configuration of the particles, the range from 5 volume % to 20 volume % is generally preferable. Where the content is less than this range, it becomes difficult to cover the other surface of the substrate, and sufficient heat radiating properties cannot be effected. And where the content is greater than this range, the substrate may become brittle, or the molding thereof may become difficult.

It is desirable that at least one part of the paramagnetic material (inclusive of ferromagnetic material) powder appears on the other surface. Even where a thin resin film is formed on the surface of the heat radiating layer, the heat radiating properties can be obtained to some degree, but where at least one part of the paramagnetic material (inclusive of ferromagnetic material) powder appears on the other surface, and preferably, the paramagnetic material (inclusive of ferromagnetic material) powder appears on the entire surface of the other surface, the heat radiating properties are further improved.

In the heat radiating layer, the paramagnetic material (inclusive of ferromagnetic material) powder is combined with the substrate integrally, and paramagnetic material (inclusive of ferromagnetic material) particles are combined with each other with the resin composing the substrate. Therefore, there does not occur such a trouble that the paramagnetic material (inclusive of ferromagnetic material) particles fall off the substrate, and consequently, stable heat radiating properties can be maintained over a long period of time.

In accordance with the producing method for producing the high thermal conduction insulator of the present invention, conventional molding methods such as the injection molding, the compression molding, etc. can be used. After supplying pellets for molding, each containing the diamagnetic material powder and the paramagnetic material (inclusive of ferromagnetic material) powder, into the mold, the heating and melting process may be carried out, or a molding material exhibiting fluidity, which is composed of a liquid resin exhibiting electrical insulating properties, the diamagnetic material powder and the paramagnetic material (inclusive of ferromagnetic material) powder, may be supplied into the mold.

The liquid resin may be provided by heating a thermoplastic resin into a liquid state, or may be composed of a liquid thermosetting resin prior to hardening. The above-exemplified materials can be used as the liquid resin, the diamagnetic material powder and the paramagnetic material (inclusive of ferromagnetic material) powder.

The most suitable value of the composition ratio of raw materials varies according to the kind of the resins, viscosity, aspect ratio of powders, etc. so that it is needed to determine the most suitable value thereof in the above-described content range through trial and error.

A magnetic field is applied to the molding material in the mold, while keeping its fluidity, such that the clusters, each being composed of a plurality of diamagnetic material particles joined together like a chain, are oriented in the directions of the lines of magnetic force, and the paramagnetic material (inclusive of ferromagnetic material) powder conforms to the mold surface adapted to mold the other surface of the substrate. For example, the N pole and the S pole may be arranged so as to face each other in one surface and the other surface of the substrate, or it is preferable to arrange one piece of magnet on the side of the mold surface adapted to mold the other surface of the substrate. In this case, the directions of the lines of magnetic force can be brought into the directions from the one surface of the substrate toward the other surface thereof, or the directions opposite thereto, and consequently, the diamagnetic material powder can be oriented in the directions along the lines of magnetic force. In addition, the paramagnetic material (inclusive of ferromagnetic material) powder is drawn in such a direction as to be attracted with the magnet so that it can be oriented along the one surface of the mold surfaces, which is on the side of the magnet.

A permanent magnet may be used to apply the magnetic field, or (superconducting) electromagnets can be used. However, in the case of the permanent magnet, the paramagnetic material (inclusive of ferromagnetic material) powder is attracted with the molding surface of the mold and peeled off the surface of the molded body when removed from the mold after molding, and consequently, the heat radiating layer may be damaged. Therefore, it is desirable to use an electromagnet which is capable of readily changing over the magnetic force from on to off or vice versa. In addition, the magnet may partly define the mold, and may be arranged outside the mold.

The most suitable value of the strength of the magnetic field varies according to the viscosity of the molding material, the aspect ratio of powder, etc. so that it is needed to determine the most suitable value in the above-described content range through trial and error. In order to form clusters of the diamagnetic material powder sufficiently, it is generally desirable to determine the magnetic flux density to one tesla or more.

The mold may be composed of the material through which the lines of magnetic force can penetrate, and aluminum, an aluminum alloy or copper are desirable.

Upon applying a magnetic field, the clusters, each being composed of a plurality of diamagnetic particles joined together like a chain, are oriented in the directions of the lines of magnetic force, and the paramagnetic material (inclusive of ferromagnetic material) powder is drawn with the magnetic force and oriented to conform to one surface of the mold surfaces, which is adapted to mold the other surface of the substrate. The molding material in such a state solidifies, and consequently, the diamagnetic material powder and the paramagnetic material (inclusive of ferromagnetic material) powder are secured in such a state. As a result, there is molded the high thermal conduction insulator of the present invention, in which the clusters, each being composed of the diamagnetic material particles joined together like a chain, are oriented from one surface towards the other surface, the paramagnetic material (inclusive of ferromagnetic material) particles are combined with the resin composing the substrate, and the heat radiating layer is provided on the other surface of the substrate.

EMBODIMENT

Hereinafter, the present invention will be explained concretely based on one embodiment. In the present embodiment, the present invention is applied to a heat radiating board for use in an inverter.

FIG. 1 illustrates a cross-sectional view of a heat radiating board of the present embodiment. This heat radiating board has one surface 10 and the other surface 11, and includes a substrate 1 composed of a PPS resin, clusters 2 which are oriented from one surface 10 towards the other surface 11, and a heat radiating layer 3 formed on the side of the other surface 11.

Figure 2:
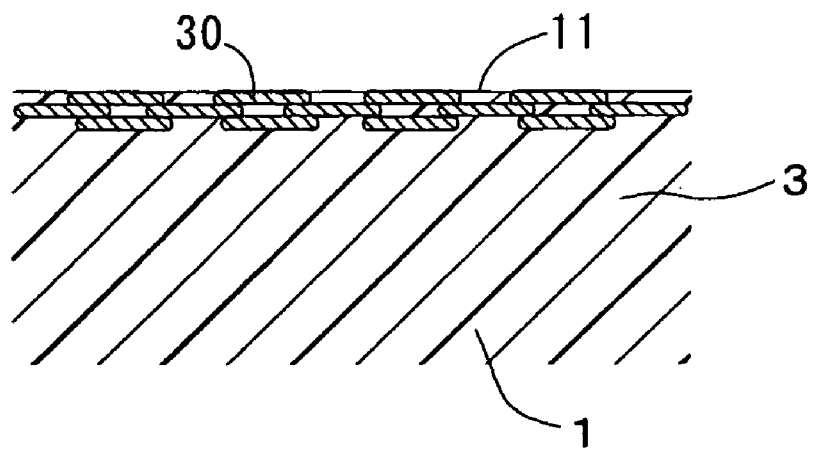
FIG. 2 is a model enlarged cross-sectional view of a heat radiating layer in a heat radiating board in one embodiment of the present invention.

The cluster 2 is formed such that scale-shaped boron nitride particles are joined together like a chain. And, as shown in FIG. 2, the heat radiating layer 3 has the construction that iron powder sheets 30 are piled up in several layers, and a lowermost part thereof is combined with the substrate 1, whereas in an upper part thereof, the iron powder sheets 30 are combined with each other by the PPS resin which composes the substrate 1. In the heat radiating layer 3, iron powder 30 appears over the generally entire surface thereof. And, as shown in FIG. 1, the clusters 2 are partly located in the heat radiating layer 3 so that more preferable heat radiating properties are effected.

Hereinafter, in order to explain the arrangement of the heat radiating board in detail, the producing method thereof will be explained.

A scale-shaped boron nitride powder was selected as the diamagnetic material powder, whereas a sheet-shaped iron powder was selected as the ferromagnetic material powder. The average particle diameter of the boron nitride powder is 1.5 μm and the aspect ratio is 10 on average. And the average particle diameter of the iron powder is 45 μm and the aspect ratio is 5 on average. The boron nitride powder and the iron powder were mixed with a PPS resin such that the composition ratio of the boron nitride powder to the PPS resin is 20 volume % and that of the iron powder is 10 volume % to prepare pellets for molding.

Figure 3:
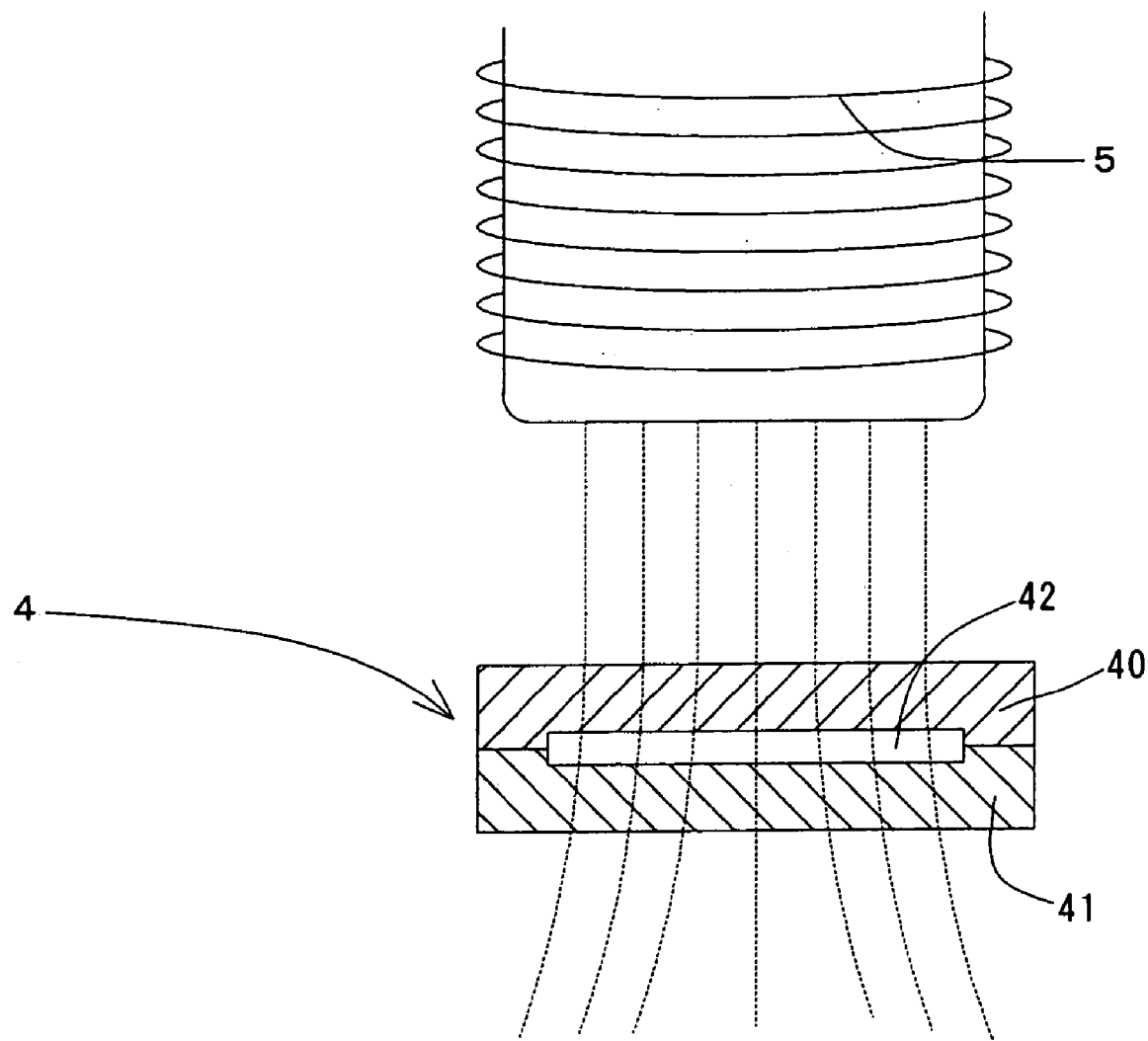
FIG. 3 is a model cross-sectional view showing the producing method in one embodiment of the present invention.

These pellets for molding were subjected to the compression molding using a mold 4 shown in FIG. 3. The mold 4 is composed of an aluminum alloy, and includes an upper mold 40 and a lower mold 41 which define a plate-shaped mold cavity 42 inside the mold. The mold 4 was placed in a high magnetic field shown in FIG. 3. The lines of magnetic force penetrate the mold cavity 42 in the directions of thickness thereof. The magnetic field is generated using a superconducting coil 5 as a high magnetic field generating device.

A predetermined amount of the pellets for molding is supplied into the mold cavity 42, and after heated to about 350° C., the pellets in a molten state are subjected to the compression molding. Consequently, the boron nitride powder is oriented in parallel with the directions of the lines of magnetic force to form the clusters 2, and the iron powder is drawn with the magnetic force and is oriented along the one mold surface defining the mold cavity 42. By cooling the mold in this state, the PPS solidifies, and the boron nitride powder and the iron powder were secured in the above-described state.

As described above, with the producing method in accordance with the present invention, the clusters 2 and the heat radiating layer 3 can be formed simultaneously with a single molding process.

The heat radiating board of the present embodiment, which was produced with the above-described method, is arranged so that the one surface 10 contacts a surface of a case of an inverter. No iron powder exists in the one surface 10 so that high electrical insulating properties are ensured between the one surface 10 and the case of the inverter. And heat generated in the inverter is transmitted from the one surface 10 to the other surface 11 by way of the clusters 2, and is radiated from the heat radiating layer 3 efficiently so that the inverter is prevented from being overheated. In addition, the heat radiating layer 3 performs the shielding function against electromagnetic waves so that electromagnetic waves are prevented from leaking outwardly from the inverter, or intruding inwardly from the exterior of the inverter.

What is claimed is:

1. A high thermal conduction insulator which is used with one surface thereof in contact with a facing member for radiating heat of the facing member from the other surface opposite to the one surface, comprising:
   a substrate composed of a resin exhibiting electrical insulating properties, and having one surface and the other surface opposite to said one surface of said substrate; and
   a diamagnetic material powder, and a paramagnetic material powder including ferromagnetic material, which are included in said substrate, wherein said diamagnetic material powder is oriented from said one surface of said substrate toward said the other surface thereof as clusters, each being composed of a plurality of diamagnetic material particles of said diamagnetic material powder, which are joined together like a chain, and said paramagnetic material powder including said ferromagnetic material mainly exists on the side of said the other surface of said substrate, thereby forming a heat radiating layer.

2. A high thermal conduction insulator as claimed in claim 1, wherein at least one part of said paramagnetic material powder including said ferromagnetic material appears on said the other surface of said substrate.

3. A high thermal conduction insulator as claimed in claim 1, wherein said diamagnetic material powder is ceramics.

4. A high thermal conduction insulator as claimed in claim 1, wherein said diamagnetic material powder also exists in one part of said heat radiating layer.

5. A high thermal conduction insulator as claimed in claim 1, wherein said diamagnetic material powder have the aspect ratio of 5 or more.

6. A high thermal conduction insulator as claimed in claim 1, wherein said diamagnetic material powder is included in the range from 10 volume % to 40 volume % in said substrate.

7. A high thermal conduction insulator as claimed in claim 1, wherein said diamagnetic material powder is selected from the group consisting of boron nitride, alumina and silicon nitride.

8. A high thermal conduction insulator as claimed in claim 1, wherein said paramagnetic material powder including said ferromagnetic material is selected from the group consisting of iron, ferrite and nickel.

9. A high thermal conduction insulator as claimed in claim 1, wherein said paramagnetic material powder including said ferromagnetic material is included in the range from 5 volume % to 20 volume % in said substrate.

10. A method for producing a high thermal conduction insulator as claimed in claim 1, comprising the steps of:
    supplying a molding material composed of an electrical insulating liquid resin, a diamagnetic material powder, and a paramagnetic material powder including ferromagnetic material, and exhibiting fluidity into a mold;
    applying a magnetic field to said molding material in said mold to orient clusters, each being composed of diamagnetic material particles of said diamagnetic material powder, which are joined together like a chain, along directions of lines of a magnetic force, and draw said paramagnetic material powder including said ferromagnetic material with the magnetic force so as to conform to one of mold surfaces of said mold; and
    solidifying said molding material in said mold to secure said diamagnetic material powder and said paramagnetic material powder including said ferromagnetic material to the matrix resin.

* * * * *